(12) United States Patent
Lin

(10) Patent No.: US 8,246,335 B2
(45) Date of Patent: Aug. 21, 2012

(54) APPARATUS FOR MOLDING OPTICAL FIBER CONNECTOR

(75) Inventor: Chun-Yu Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/976,965

(22) Filed: Dec. 22, 2010

(65) Prior Publication Data
US 2011/0244068 A1   Oct. 6, 2011

(30) Foreign Application Priority Data

Apr. 1, 2010   (TW) .............................. 99110247 A

(51) Int. Cl.
*B29D 11/00* (2006.01)
*B29C 45/36* (2006.01)

(52) U.S. Cl. ................. 425/127; 425/129.1; 425/192 R; 425/573; 425/589; 425/414; 425/468; 425/808

(58) Field of Classification Search .................. 425/395, 425/397, 556, 577, 571, 572, 588, 589, 403, 425/414, 468, 470, 436 R, 436 RM, 573, 425/808, 110, 112, 127, 129.1, 123, 121; 264/328.1, 328.9, 318, 334, 1.1, 1.32; 249/63, 249/64, 176
See application file for complete search history.

(56) References Cited

U.S. PATENT DOCUMENTS

| | | | | |
|---|---|---|---|---|
| 3,824,053 A * | 7/1974 | Styrkowicz | ................... | 425/123 |
| 4,012,827 A * | 3/1977 | Abrams | .......................... | 29/453 |
| 4,236,689 A * | 12/1980 | Hass | ............................. | 249/204 |
| 4,917,846 A * | 4/1990 | Takase et al. | ................. | 264/130 |
| 5,391,346 A * | 2/1995 | Nakamura et al. | ....... | 264/272.14 |
| 5,707,565 A * | 1/1998 | Suzuki et al. | ................. | 264/1.25 |
| 6,315,541 B1 * | 11/2001 | Maeda et al. | ................. | 425/127 |
| 6,394,779 B1 * | 5/2002 | Komazawa et al. | .......... | 425/123 |
| 6,671,432 B2 * | 12/2003 | Imada et al. | .................... | 385/33 |
| 6,705,854 B2 * | 3/2004 | Kashiyama | .................... | 425/556 |
| 6,841,114 B2 * | 1/2005 | Fujiwara et al. | ......... | 264/328.12 |
| 7,309,229 B2 * | 12/2007 | Ueda et al. | ..................... | 425/577 |
| 7,412,130 B2 * | 8/2008 | Harness et al. | .................. | 385/31 |
| 7,665,905 B2 * | 2/2010 | Tamura et al. | .................. | 385/88 |
| 2002/0051830 A1 * | 5/2002 | Takikawa et al. | ............. | 425/112 |
| 2003/0001297 A1 * | 1/2003 | Suematsu et al. | ............ | 264/1.25 |

(Continued)

FOREIGN PATENT DOCUMENTS

EP    1146370 A2 * 10/2001

(Continued)

*Primary Examiner* — Dimple Bodawala
(74) *Attorney, Agent, or Firm* — Altis Law Group, Inc.

(57) ABSTRACT

An apparatus for molding optical fiber connector is provided. The optical fiber connector includes a main body. The main body has a blind hole for receiving an optical fiber two opposite surfaces being substantially parallel with the blind hole, and a lens portion aligned with the blind hole. The apparatus comprises a molding cavity and an insert for forming the blind hole. The molding cavity includes a central portion for forming the main body, a lens-forming portion for forming the lens portion, and two lateral portions for forming the corresponding surfaces. The molding cavity includes a first gate and a second gate for introducing molding material into the molding cavity. The first gate is located between the insert and one of the two lateral portions and the second gate is defined between the insert and the other one of the lateral potions.

1 Claim, 2 Drawing Sheets

U.S. PATENT DOCUMENTS

| | | | |
|---|---|---|---|
| 2004/0101587 A1* | 5/2004 | Nix et al. | 425/468 |
| 2005/0238747 A1* | 10/2005 | Chandra | 425/127 |
| 2006/0263034 A1* | 11/2006 | Sakurai et al. | 385/147 |
| 2008/0054528 A1* | 3/2008 | Chueh | 264/328.12 |
| 2010/0203929 A1* | 8/2010 | Skagmo et al. | 455/575.1 |
| 2011/0097432 A1* | 4/2011 | Yu et al. | 425/116 |
| 2011/0150393 A1* | 6/2011 | Lin | 385/53 |
| 2011/0158589 A1* | 6/2011 | Lin | 385/74 |
| 2011/0211791 A1* | 9/2011 | Wu | 385/56 |
| 2011/0222820 A1* | 9/2011 | Wu | 385/89 |
| 2011/0236521 A1* | 9/2011 | Wu | 425/446 |
| 2011/0256254 A1* | 10/2011 | Yen | 425/123 |
| 2011/0262577 A1* | 10/2011 | Wu | 425/185 |
| 2011/0262582 A1* | 10/2011 | Wu | 425/542 |
| 2011/0272839 A1* | 11/2011 | Wu | 264/40.5 |
| 2011/0278748 A1* | 11/2011 | Hsu | 264/1.26 |
| 2011/0278749 A1* | 11/2011 | Yu et al. | 264/1.26 |
| 2011/0287125 A1* | 11/2011 | Lin | 425/467 |
| 2012/0034334 A1* | 2/2012 | Lin | 425/577 |
| 2012/0058212 A1* | 3/2012 | Lin | 425/123 |

FOREIGN PATENT DOCUMENTS

| | | | |
|---|---|---|---|
| GB | 2233596 A | * | 1/1991 |
| JP | 01263034 A | * | 10/1989 |
| JP | 05093826 A | * | 4/1993 |
| JP | 05241041 A | * | 9/1993 |
| JP | 2001311854 A | * | 11/2001 |
| JP | 2002048945 A | * | 2/2002 |
| WO | WO 2008117576 A1 | * | 2/2008 |

* cited by examiner

APPARATUS FOR MOLDING OPTICAL FIBER CONNECTOR

BACKGROUND

1. Technical Field

The present disclosure relates to an apparatus for molding an optical fiber connector.

2. Description of Related Art

Optical fiber connectors often include at least one blind hole and at least one lens integrated with the blind hole. Each blind hole is behind a lens. The blind hole is used to receive an optical fiber coupled with the lens to transform optical signals.

An injection molding apparatus having a molding cavity is used to mold the optical fiber connectors. An insert for molding the blind hole is defined in the molding cavity. One gate for inputting material of the optical fiber connector is defined in the molding cavity close to the insert. Because the material for forming the optical fiber connector flows into the molding cavity through the gate, the material may contact or press against the insert and displace or damage the insert.

BRIEF DESCRIPTION OF THE DRAWINGS

Many aspects of the present apparatus for molding optical fiber connector can be better understood with reference to the following drawings. The components in the drawings are not necessarily drawn to scale, the emphasis instead being placed upon clearly illustrating the principles of the present apparatus for molding optical fiber connector. Moreover, in the drawings, like reference numerals designate corresponding parts throughout the several views.

DETAILED DESCRIPTION

Embodiments of the present apparatus for molding an optical fiber connector will now be described in detail below and with reference to the drawings.

Figure 1:
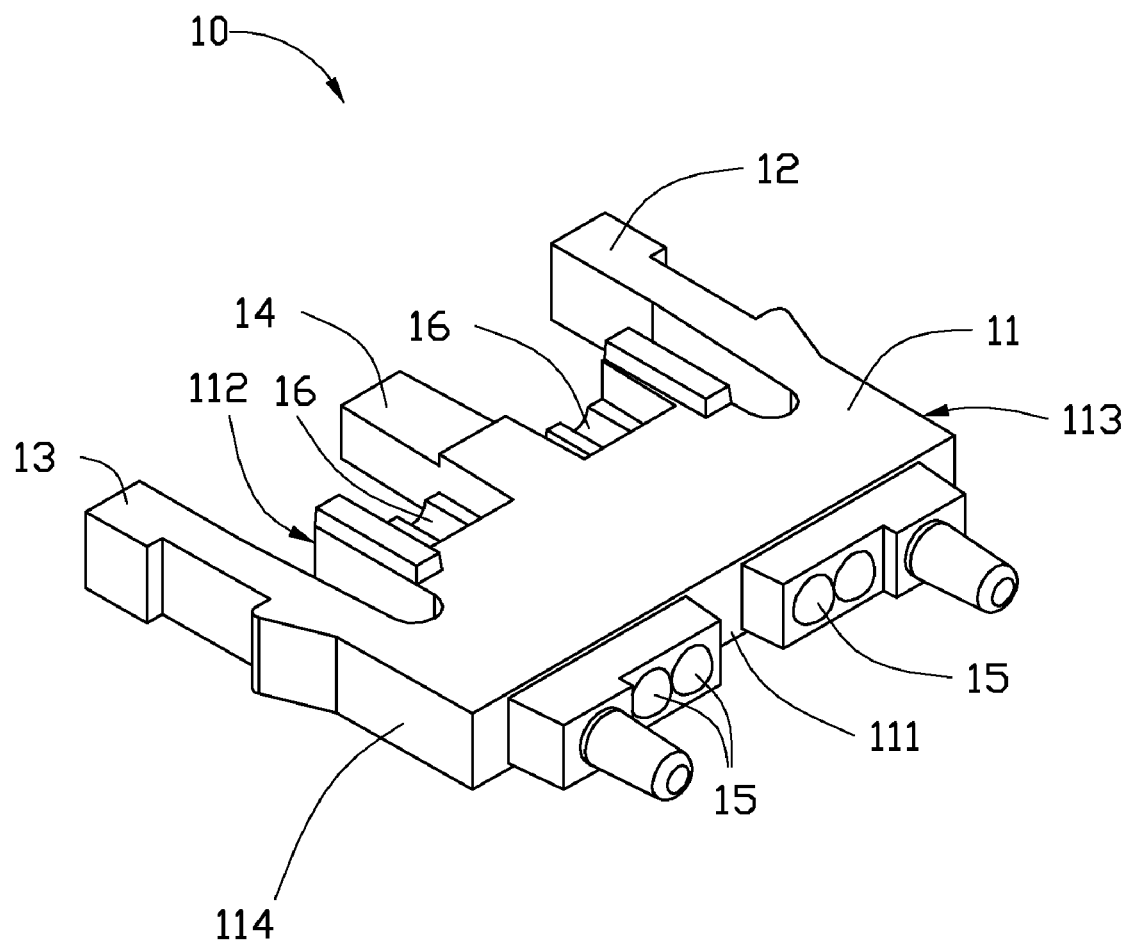
FIG. 1 is a schematic view of an optical fiber connector.
Figure 2:
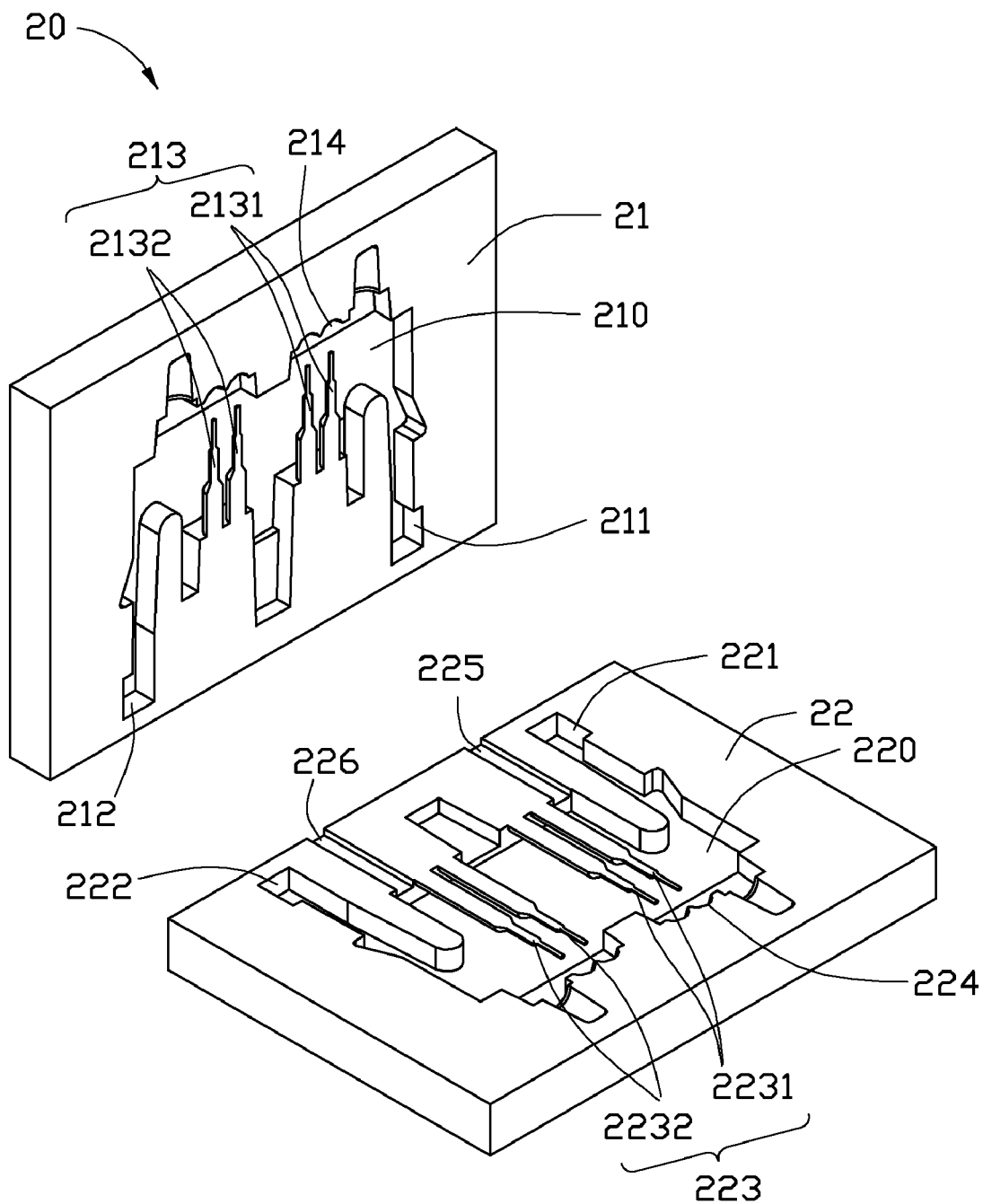
FIG. 2 is a schematic view of an apparatus for molding the optical fiber connector shown in FIG. 1.

Referring to FIG. 1 and FIG. 2, an apparatus 20 for molding an optical fiber connector 10 in accordance with an embodiment is shown.

The optical fiber connector 10 includes a main body 11 and four lenses 15 integrated with the main body 11. The main body 11 includes a first arm 12, a second arm 13 opposite to the first arm 12, and a middle portion 14 between the first arm 12 and the second arm 13. The first arm 12 and second arm 13 are configured to hold the optical fiber connector 10 in place.

The main body 11 includes a first surface 111, a second surface 112 opposite to the first surface 111, a third surface 113, and a fourth surface 114 opposite to the third surface 113. The first surface 111 is connected with the third surface 113 and the fourth surface 114. The second surface 112 is also connected with the third surface 113 and the fourth surface 114. The third surface 113 and the fourth surface 114 are parallel with the blind hole 16.

The lenses 15 are defined on the first surface 111. Four blind holes 16 are defined in the second surface 112 and each extend from the second surface 112 to the first surface 111. Two of the four blind holes 16 are defined between the first arm 12 and the middle portion 14. The other two blind holes 16 are defined between the second arm 13 and the middle portion 14. Each of the blind holes 16 is configured for receiving an optical fiber. The lenses 15 are optically coupled to the optical fibers in the blind holes 16 respectively. Each of the blind holes 16 has a central axis and each of the lenses 15 has an optical axis. The central axis of the blind holes 16 coincide with the optical axis of the lenses 15 respectively.

The first arm 12 and the second arm 13 extend out from the second surface 112. The first arm 12 and the second arm 13 are available for grasping by a user when manipulating the connector 10.

In applications where grasping portions are not needed or can be otherwise designed, the first arm 12 and the second arm 13 may be omitted.

The apparatus 20 for molding the optical fiber connector 10 includes an upper core 21 and a bottom core 22.

The upper core 21 includes an upper molding cavity 210, a first upper cavity 211, a second upper cavity 212, four first inserts 213, and a first lens-forming portion 214. The four first inserts 213 are divided into a first group 2131 having two inserts and a second group 2132 having the other two inserts.

The bottom core 22 includes a bottom molding cavity 220, a first bottom cavity 221, a second bottom cavity 222, four second inserts 223, and a second lens-forming portion 224. The second inserts 223 includes a third group 2231 and a fourth group 2232.

The upper molding cavity 210 can mate with the bottom molding cavity 220 to form the main body 11 of the optical fiber connector 10. The first upper cavity 211 combines with the first bottom cavity 221 as the mold for the first arm 12. The second upper cavity 212 combines with the second bottom cavity 222 to form the second arm 13. The first inserts 213 combine with the second inserts 223 in order to form the four blind holes 16. The first lens-forming portion 214 combines with the second lens-forming portion 224 to form the lenses 15.

A first gate 225 is defined between the third group 2231 and the first bottom cavity 221. A second gate 226 is defined between the fourth group 2232 and the second bottom cavity 222. The length direction of the first gate 225 is parallel with that of the second gate 226. The length direction of the first gate 225 is essentially parallel with the central axes of the second inserts 223.

In the injection process, the material for forming the optical fiber connector 10 flows into the upper molding cavity 210 and the bottom molding cavity 220 through the first gate 225 and the second gate 226, and then the optical fiber connector 10 is molded.

The material for forming the optical fiber connector 10 flows into the upper molding cavity 210 and the bottom molding cavity 220 in a direction parallel with the first inserts 213 and the second inserts 223, a force of impact between the material and the inserts is reduced, thus the first inserts 213 and the second inserts 223 will not be displaced or damaged.

It is understood that the first gate 225 can be defined between the first group 2131 and the first upper cavity 211, and the second gate 226 can be defined between the second upper cavity 212 and the second group 2132.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An apparatus adapted for molding optical fiber connector, the optical fiber connector including a main body (11) and four lens portion (15) integrated with the main body (11), wherein the main body (11) including a middle portion (14) and two arms (12,13) extending from the main body (11) and positioned at two opposite sides of the middle portion (14), the main body (11) defining four blind holes (16) for receiving optical fibers, each of the lens portions (15) aligned with a respective one of the blind holes (16), two of the four blind holes (16) being located between one of the two arms (12,13) and the middle portion (14), the other two of the four blind holes (16) being located between the other of the two arms (12,13) and the middle portion (14); wherein the apparatus comprising: an upper core (21), and a lower core (22), wherein the upper core (21) includes an upper molding cavity (210), four first inserts (213) and a first lens-forming portion (214); wherein the lower core (22) includes a lower molding cavity (220), four second inserts (223) and a second lens-forming portion (224), wherein the upper molding cavity (210) and the lower molding cavity (220) cooperatively constituting the molding cavity, wherein the first inserts (213) combined with the second inserts (223) and being configured to form a respective one of the four blind holes, the molding cavity including a central portion adapted for forming the main body; wherein the first lens forming portions (214) combined with the second lens forming portions (224) and being adapted for forming the lens portions, and two lateral portions adapted for forming the corresponding arm, wherein the molding cavity including a first gate (225) and second gate (226) for introducing molding material into the molding cavity, wherein the first gate (225) being essentially parallel with the second gate (226) and being essentially parallel with the inserts (223), the first gate (225) located between the inserts and one of the lateral portion distal from the lens-forming portion, the second gate defined between the inserts and the other one of the lateral portions.

\* \* \* \* \*